US005711185A

United States Patent [19]

Hörmann

[11] Patent Number: 5,711,185
[45] Date of Patent: Jan. 27, 1998

[54] DOOR DRIVE WITH A CHAIN

[75] Inventor: Michael Hörmann, Marienfeld, Germany

[73] Assignee: Marantec Antriebs - und Steuerungstechnik GmbH & Co. Produktions KG, Marienfield, Germany

[21] Appl. No.: 500,871

[22] PCT Filed: Jan. 18, 1994

[86] PCT No.: PCT/DE94/00034

§ 371 Date: Sep. 20, 1995

§ 102(e) Date: Sep. 20, 1995

[87] PCT Pub. No.: WO94/17273

PCT Pub. Date: Aug. 4, 1994

[30] Foreign Application Priority Data

Jan. 19, 1993 [DE] Germany .......................... 43 01 255.8
Jul. 13, 1993 [DE] Germany .......................... 43 23 424.0

[51] Int. Cl.$^6$ .......................... F16H 19/06; F16H 55/17; E05F 11/42

[52] U.S. Cl. .......................... 74/89.21; 49/362; 384/125; 384/220; 474/150

[58] Field of Search .............................. 74/89.21; 49/360, 49/362; 384/125, 220; 403/326, 329; 474/148, 150

[56] References Cited

U.S. PATENT DOCUMENTS

| | | | |
|---|---|---|---|
| 1,641,135 | 6/1927 | Gosline | 74/89.21 |
| 2,063,895 | 12/1936 | Mack | 403/329 X |
| 2,732,601 | 1/1956 | Franko | 268/59 |
| 2,822,166 | 2/1958 | Herbert | 268/59 |
| 3,587,660 | 6/1971 | Dion | 384/125 |
| 4,231,191 | 11/1980 | Ellmore | 49/28 |
| 5,236,148 | 8/1993 | Valentine | 384/125 |
| 5,511,878 | 4/1996 | Dedoes et al. | 403/326 X |

FOREIGN PATENT DOCUMENTS

| | | | |
|---|---|---|---|
| 1318931 | 1/1963 | France . | |
| 2054 397 | 5/1972 | Germany | E05F 15/02 |
| 80 29 667 | 2/1981 | Germany | E05F 15/14 |
| 2117 325 | 10/1992 | Germany | E05F 15/10 |
| 530254 | 12/1940 | United Kingdom | 474/148 |

*Primary Examiner*—Allan D. Herrmann
*Attorney, Agent, or Firm*—Robert S. Lipton; Lipton & Husick

[57] ABSTRACT

The invention relates to apparatus for driving a door or the like guided in at least two guides using a drive (1) located in a channel formed as a guide track (2) and which consists of at least one turn-around pinion (5), a chain extending over drive pinion (4) and turn-around pinion (5) and at least one carrier element for a door panel or the like attached to the chain. A structurally simple apparatus which is installable in simple manner is achieved by forming the drive pinion (4), the turn-around pinion (5) and the chain together with the guide track (2) as completely preassembled unit (1).

(FIG. 1)

5 Claims, 4 Drawing Sheets

DOOR DRIVE WITH A CHAIN

BACKGROUND OF THE INVENTION

The invention relates to apparatus for driving a door or the like guided in at least two tracks, having a drive mechanism with a cross-section shaped like a guide track, consisting of a drive sprocket connected to a drive motor, at least one turn-around sprocket and at least one carrier element for a door panel or the like attached to the chain.

Such apparatus is known from the prior art and is used particularly for driving door panels which are guided in two guides and consist of several leaves interconnected in pivotable manner. To drive such door panels, there is normally provided a drive motor to which there is flange-mounted a reducing gear, which is connected by a shaft to the drive sprocket. The drive sprocket is in closed-loop engagement with a chain, and particularly a roller chain, which is looped over a turn-around pinion. A carrier element is attached to the chain, which forms the interconnection between the chain and the door panel.

In the prior art, the drive sprocket and the turn-around sprocket are retained in appropriate bearings, which are fastened to the building, Accordingly, in the prior art, the installation of such apparatus required, as a first step, that the bearings with the respective drive sprocket and turn-around sprocket be fastened at an appropriate location on the building, and particularly that these be screwed on, after which the roller chain with the carrier is engaged on the drive sprocket and the turn-around sprocket and finally the carrier is attached to the door panel.

It will be seen that the apparatus known in the prior art requires a relatively burdensome installation on the building, and, if not mounted correctly, may be unreliable under some circumstances.

SUMMARY OF THE INVENTION

Proceeding from this prior art, it is the task of the invention to provide apparatus of this type for driving a door or the like which is guided in at least two tracks, which is capable of being mounted on the building in a simple manner, and which provides reliable and trouble-free operation even when mounted by non-professionals.

The solution to this task is provided by apparatus of this type in which the drive sprocket, the turn-around sprocket and the chain, together with the guide rail, form a completely preassembled unit.

Apparatus embodying this concept for driving a door guided in two tracks or the like has the special advantage that the components of the apparatus provide a drive assembly which is completely reliable and extremely easy to handle in installation, which can also be easily installed by non-professionals. To this end, the drive sprocket, the turn-around sprocket and the chain are preassembled together with the guide track, so that, in installing this preassembled unit, only the guide track needs to be attached to the building and then the carrier of the chain to the door panel. Thus there are eliminated the steps needed for the apparatus known from the prior art, of separate installation of drive sprocket and turn-around sprocket on the building and subsequent application of the chain to the drive sprocket and turn-around sprocket.

An embodiment of the inventive apparatus which is especially simple in its structure results from having the drive sprocket and the turn-around sprocket positioned in at least one retaining fork which is removably retained within the guide track. In so doing, it has proven to be particularly advantageous to position the drive sprocket and the turn-around sprocket in separate retaining forks. This arrangement has the special advantage that it simplifies the manufacture of apparatus of this type because an installation unit consisting of retaining fork and drive sprocket, or turn-around sprocket, can easily be slid into the guide track, so that a unit is formed which can be readily attached to the building.

It is further advantageous to make the retaining fork of a synthetic material, preferably a pressure setting plastic. This achieves easy and inexpensive production of the retaining fork and furthermore substantially reduces the overall weight of the unit consisting of drive sprocket, turn-around sprocket, chain and guide rail with inserted retaining forks.

Further simplification of the installation of the completely preassembled unit is achieved by having the retaining forks provide, for the hubs of the sprockets, bearing mounts which are open on one side and slightly undercut. Through this configuration, the sprockets can be inserted easily into the bearing mounts of the retaining forks during assembly, before the retaining forks are slid into guide track. However, it is also possible to position the sprockets in the bearing mounts only after the retaining forks have been slid into the guide track.

The insertion of the sprockets into the bearing mounts is substantially simplified by having the bearing mounts of the retaining forks resiliently clasp the hub of the sprockets. By so doing, upon an insertion movement which is oriented generally perpendicularly to the axis of rotation, the bearing mounts spread apart resiliently far enough so that the hubs of the sprockets can be easily inserted, after which they are resiliently clasped by the bearing mounts. This bearing arrangement for the sprockets, axially braced by the shaft ends themselves of the sprockets, permits exceptionally easy installation, without the so-assembled components becoming disengaged of their own accord and without any force being exerted tending to cause separation. In operation, the chain which runs over the drive sprockets and the turn-around sprockets acts in opposition to such a force, so that the connection which is created solely through insertion against a resilient resistance becomes reinforced during operation and separation of sprockets and retaining fork is precluded.

In accordance with an additional feature of the invention, the retaining fork is provided with at least one projection which snaps into a corresponding recess in the guide track. Through this construction of the retaining fork and the guide track, there is achieved secure retention of the retaining fork in the guide track in a structurally simple manner. Moreover, during installation of the retaining fork in the guide track, the accurate positioning of the retaining fork in the guide track is manifested by a discernable snapping of the projection into the recess in the guide track. Preferably, each retaining fork has two bulges on opposite surfaces, which flatten out in the insertion direction and which have the shape of a projection in the opposite direction and which prevent the retaining fork from pulling out of the guide track through engagement of the projection with the edges of the recesses.

Further manufacturing simplification of the apparatus according to the invention is achieved by having the guide track consist of two identical halves. Such a guide track can be made, for example, by a continuous casting process, the individual guide tracks being separable from the endless channel in any desired length.

BRIEF DESCRIPTION OF THE DRAWINGS

Below there is further described a preferred exemplary embodiment of the invention, which is illustrated in the drawing. In the drawing there is shown in:

FIG. 1 a top view of apparatus for driving a door guided in two guides, or the like;

DESCRIPTION OF THE PREFERRED EMBODIMENT

Figure 1:
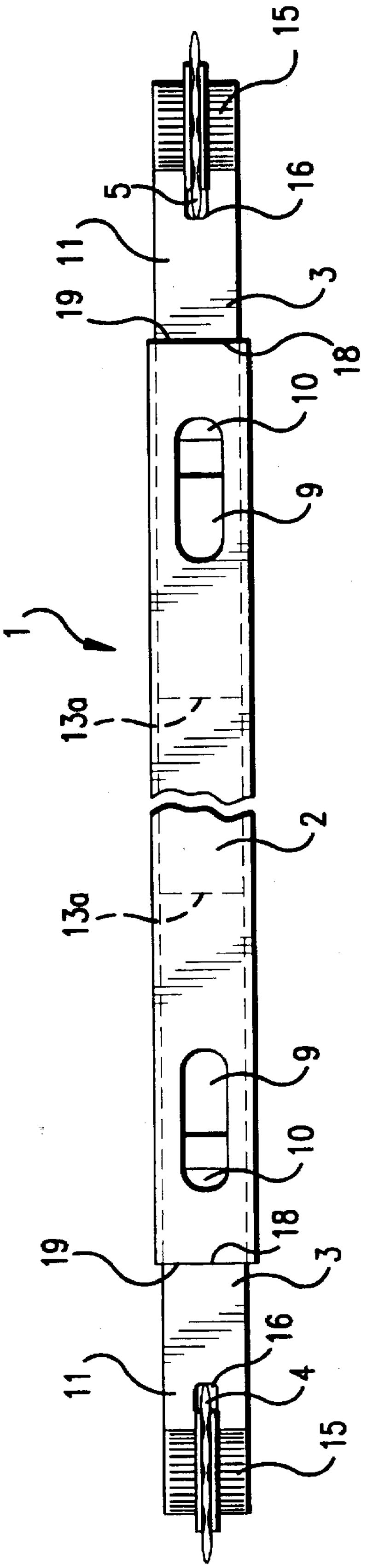
Figure 2A:
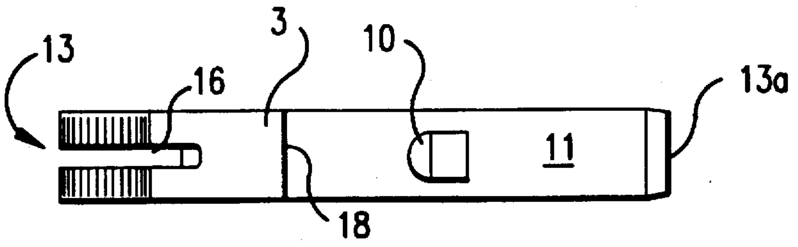
FIG. 2*a* a top view of a retaining fork as shown in FIG. 1.
Figure 2B:
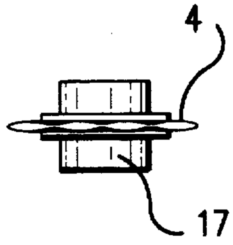
FIG. 2*b* a top view of a drive/turn-around sprocket as shown in FIG. 1.
Figure 2C:
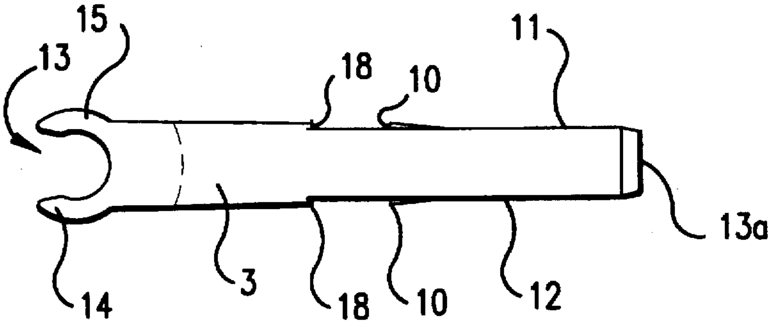
FIG. 2*c* an elevation of the retaining fork shown in FIG. 2*b;*
Figure 2D:
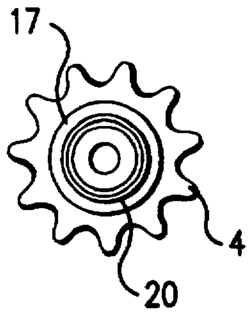
FIG. 2*d* an elevation of the sprocket shown in FIG. 2*b;*

In FIG. 1 there is shown a unit 1 which consists of a guide track 2, retaining forks 3, a drive sprocket 4, and a turn-around sprocket 5. Not shown is a roller chain which completes the apparatus for driving a door or the like guided in at least two guides, to which there is attached a carrier connected to the door panel or the like.

Figure 3A:
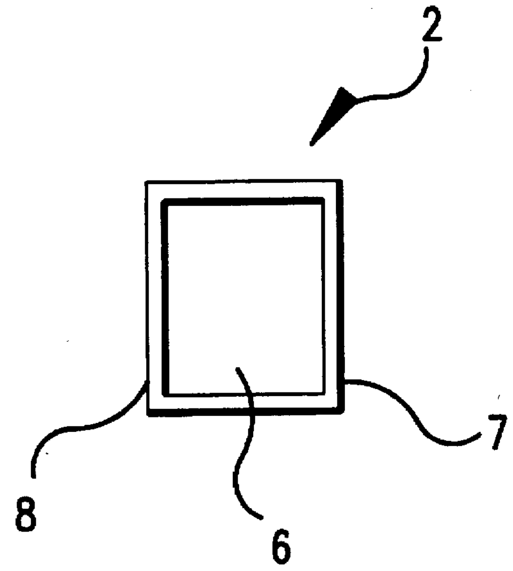
FIG. 3*a* an end view of a guide track as shown in FIG. 1.

The guide track 2 takes the form of a channel segment with a square cross-section and has a continuous opening 6 also of square cross-section. Moreover, the guide track 2 consists of two U-shaped halves 7 and 8, which are joined in their assembled state in such a manner that the guide track 2 is formed with the square opening (FIG. 3*a*) 6.

Figure 3B:
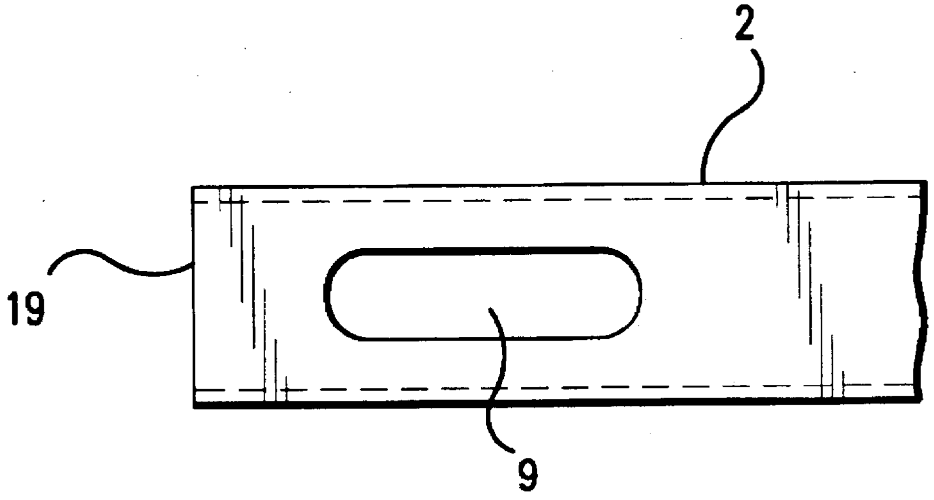
FIG. 3*b* an elevation of a segment of the guide track shown in FIG. 1.

As can be seen particularly from FIG. 3*b*, the guide track 2 has, in oppositely located surfaces, longitudinally elongated holes 9 with ends which are rounded in their lengthwise direction.

In the preassembled unit 1 these longitudinally elongated holes 9 are engaged by projections 10, which are positioned on oppositely located surfaces 11, 12 of the retaining fork 3. The projections 10 merge into surfaces 11, 12 in the lengthwise direction of the retaining fork 3.

The retaining fork 3 made of plastic has at its one end a bearing mount 13 open on one side and slightly undercut, which is formed by two prongs 14, 15 located at the end of the retaining fork 3. Further, the retaining fork 3 also has a longitudinally extending slot 16, which is located in the vicinity of the bearing mount 13 and is open toward the bearing mount 13. Its opposite end is designated by reference numeral 13*a*.

The drive sprocket 4 or the turn-around sprocket 5 is inserted in bearing mount 13. In FIG. 2, the drive sprocket 4 is shown together with the retaining fork 3. The drive sprocket 4, as well as the turn-around sprocket 5, has a hub 17 which can be inserted between the forks 14 and 15 of the bearing mount 13, so that the drive sprocket 4 is positioned freely rotatably in slot 16.

In addition, the retaining fork 3 has a shoulder 18 in the middle portion of the respective surfaces 11 and 12, which engages the forward edge 19 of guide track 2 when retaining fork 13 is inserted into guide track 2, so that the retaining fork 3 is held, accurately positioned and undisplaceable, in opening 6 of guide track 2 by means of projections 10 and shoulders 18.

When installing the unit 1 in FIG. 1, the first step is to preassemble the units consisting of drive sprocket 4 or turn-around sprocket 5 and retaining fork 3, the drive sprocket 4 or the turn-around sprocket 5 inserted with hub 17 into the bearing mount 13. In so doing, the bearing mount 13, during an insertion movement which is oriented generally perpendicularly to the axis of rotation, spreads apart resiliently to the extent that the hub 17 is resiliently received and clasped by prongs 14 and 15. This mounting of the hub 17 of the drive sprocket 4, or the turn-around sprocket 5 makes possible an extraordinarily simple installation, without any possibility that the so-assembled components could become disengaged of their own accord, and without having a force created, e.g. by the chain which is not shown, which is oriented in the direction of separation. In operation, the chain acts additionally in opposition to such a force, so that the connection between drive sprocket 4 or turn-around sprocket 5 and retaining fork 3, which has been created merely by insertion against a resilient resistance, is reinforced in operation.

After the retaining forks 3 have been provided with the drive sprocket 4 or the turn-around sprocket 5, the retaining forks 3 are inserted into opening 6 at the opposite ends of the guide track 2 and pushed into it until the shoulders 18 of the retaining fork 3 come into engagement with the leading edge 19 of the guide track 2. In this position, the projections 10 engage the longitudinally elongated holes 9 in such manner that the projections 10 come into engagement with the rounded ends of longitudinally elongated holes 10. As so arranged, the retaining fork 3 is held immobile in the axial direction of guide track 2.

Finally, the unit 1 is completed by means of a roller chain, not shown in the Figures, to which the carrier element for the door panel or the like is attached.

The unit 1, preassembled in this manner, can then be attached to a building in a simple manner, preferably by screwing, whereupon the carrier element which is not shown is connected to the door panel or the like and is positioned between the drive pinion 4 and a drive motor, or there is provided a drive shaft of a reducing gear flange-mounted to this drive motor which engages with its multi-tooth wheel surface a corresponding multi-tooth wheel 20 provided in the hub 17 of drive pinion 4.

Figure 4:
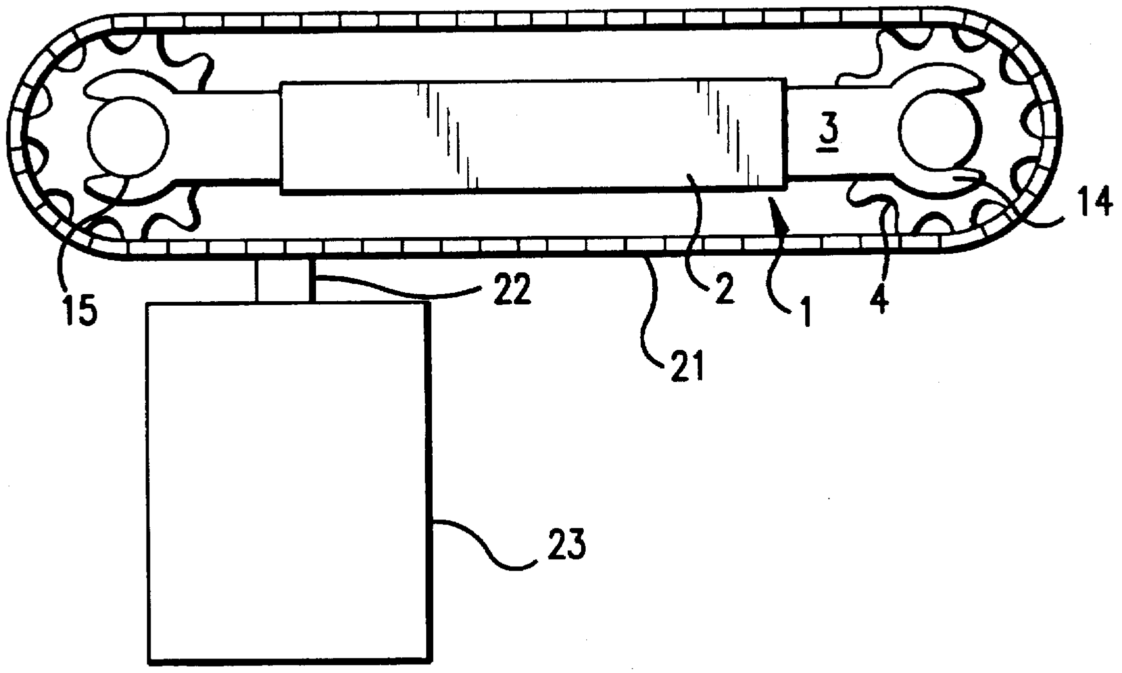
FIG. 4 a simplified, diagrammatic representation of the application of the apparatus of FIG. 1 to the drive for a door or door panel.

FIG. 4 again illustrates—in simplified diagrammatic form—the unit 1 of FIG. 1. In this FIG. 4, there are also shown other elements previously mentioned as related to this unit 1. These are chain 21, looped over sprockets 4 and 5, carrier element 22 attached to chain 21, and door, or door panel 23, which is in turn attached to carrier element 22 and is to be driven by unit 1. All of these (other) elements of FIG. 4 may take any of various conventional forms and are therefore not further described.

I claim:

1. Apparatus for driving a door or door panel, said apparatus comprising: a drive unit positioned in a channel in the form of a guide track (2), said unit including a drive sprocket (4), at least one turn-around sprocket (5) positioned in a retaining fork, a chain extending over the drive sprocket (4) and the turn-around sprocket (5) and at least one carrier element attached to the chain for a door or door panel, the drive sprocket (4), the turn-around sprocket (5) and the chain together with the guide track (2) being formed as a completely preassembled unit (1), the drive sprocket (4) being also positioned in a retaining fork (3) which is held in detachable manner within the guide track (2), the drive and turn-around sprockets having hubs (17), the retaining forks (3) having bearing mounts (13) for said hubs (17) of the sprockets (4, 5) which are open on one side and which are slightly undercut, and the bearing mounts (13) of the retaining forks (3) resiliently clasping the hubs (17) of the sprockets (4, 5).

2. Apparatus according to claim 1, characterized in that the drive pinion (4) and the turn-around pinion (5) are positioned in separate retaining forks (3).

3. Apparatus according to claim 1, characterized in that the retaining forks (3) are made of synthetic plastic.

4. Apparatus according to claim 1, characterized in that the retaining fork (3) has at least one projection (10) which snaps into a corresponding recess (9) in guide track (2).

5. Apparatus according to claim 1, characterized in that the guide track (2) consists of two identically shaped halves (7, 8).

* * * * *

UNITED STATES PATENT AND TRADEMARK OFFICE
CERTIFICATE OF CORRECTION

PATENT NO. : 5,711,185
DATED : January 27, 1998
INVENTOR(S) : Michael Hormann

It is certified that error appears in the above-identified patent and that said Letters Patent is hereby corrected as shown below:

Column 1, line 19, the word "pinion" should be replaced with the word --sprocket--

Column 5, line 8, both occurrences of the word "pinion" should be replaced with the word --sprocket--

Signed and Sealed this

Second Day of June, 1998

Attest:

BRUCE LEHMAN

Attesting Officer

Commissioner of Patents and Trademarks